US012686386B2

(12) United States Patent
Suwabe et al.

(10) Patent No.: US 12,686,386 B2
(45) Date of Patent: Jul. 21, 2026

(54) DRIVING ASSISTANCE CONTROL APPARATUS FOR VEHICLE, DRIVING ASSISTANCE CONTROL METHOD FOR VEHICLE, AND NON-TRANSITORY STORAGE MEDIUM STORING PROGRAM THEREOF

(71) Applicant: TOYOTA JIDOSHA KABUSHIKI KAISHA, Toyota (JP)

(72) Inventors: Koki Suwabe, Toyota (JP); Hiroto Katsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/947,296

(22) Filed: Nov. 14, 2024

(65) Prior Publication Data

US 2025/0196855 A1     Jun. 19, 2025

(30) Foreign Application Priority Data

Dec. 13, 2023     (JP) ................................. 2023-210176

(51) Int. Cl.
*B60W 30/12*          (2020.01)
*B60W 10/04*          (2006.01)
(Continued)

(52) U.S. Cl.
CPC ............ *B60W 30/12* (2013.01); *B60W 10/04* (2013.01); *B60W 10/20* (2013.01); *B60W 50/08* (2013.01); *B60W 30/16* (2013.01); *B60W 2520/14* (2013.01); *B60W 2540/215* (2020.02); *B60W 2552/30* (2020.02); *B60W 2554/4041* (2020.02); *B60W 2710/207* (2013.01); *B60W 2720/125* (2013.01)

(58) Field of Classification Search
None
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |

(Continued)

FOREIGN PATENT DOCUMENTS

| | | | |
|---|---|---|---|
| JP | 2008-120302 A | 5/2008 | |
| JP | 4172434 B2 | 10/2008 | |

(Continued)

*Primary Examiner* — Peter D Nolan
*Assistant Examiner* — Michael F Whalen
(74) *Attorney, Agent, or Firm* — Sughrue Mion, PLLC

(57)          ABSTRACT

A driving assistance control apparatus comprises a controller configured to perform, as a driving assistance control, a steering assistance control to automatically vary a steering angle of a host vehicle and/or an acceleration assistance control to automatically vary an acceleration of the host vehicle, based on at least a traveling state of the host vehicle. The controller is configured to receive a setting operation input from a driver of the host vehicle; and vary a strength degree of a steering assistance in the steering assistance control in accordance with the setting operation input, and/or vary a strength degree of an acceleration assistance in the acceleration assistance control in accordance with the setting operation input.

3 Claims, 8 Drawing Sheets

(51) Int. Cl.
  *B60W 10/20*    (2006.01)
  *B60W 50/08*    (2020.01)
  *B60W 30/16*     (2020.01)

(56)         References Cited

U.S. PATENT DOCUMENTS

| | | | |
|---|---|---|---|
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 2006/0025918 | A1 | 2/2006 | Saeki |
| 2018/0178839 | A1 | 6/2018 | Ide |
| 2019/0096258 | A1 | 3/2019 | Ide et al. |
| 2019/0295419 | A1 | 9/2019 | Tosa et al. |
| 2020/0047772 | A1 | 2/2020 | Yasue |
| 2023/0142656 | A1* | 5/2023 | Suzuki ................. B62D 15/029 |
| | | | 340/438 |
| 2025/0136107 | A1 | 5/2025 | Uemura et al. |

FOREIGN PATENT DOCUMENTS

| | | | |
|---|---|---|---|
| JP | 4929777 | B2 | 2/2010 |
| JP | 2013-203341 | A | 10/2013 |
| JP | 2014-148293 | A | 8/2014 |
| JP | 2018-103862 | A | 7/2018 |
| JP | 2019-059363 | A | 4/2019 |
| JP | 2020-026154 | A | 2/2020 |
| JP | 2022-139437 | A | 9/2022 |
| WO | 2023/157337 | A1 | 8/2023 |

* cited by examiner

DRIVING ASSISTANCE CONTROL APPARATUS FOR VEHICLE, DRIVING ASSISTANCE CONTROL METHOD FOR VEHICLE, AND NON-TRANSITORY STORAGE MEDIUM STORING PROGRAM THEREOF

TECHNICAL FIELD

The present disclosure relates to a driving assistance control apparatus for a vehicle, a driving assistance control method for a vehicle, and a non-transitory storage medium storing a program thereof, for assisting (supporting) a driving of a driver of a vehicle.

BACKGROUND

There has been a known driving assistance control apparatus for a vehicle, for performing various driving assistance controls. One of typical driving assistance controls is a lane keeping control and an inter-vehicle distance control.

One of the conventional apparatuses is configured to change a target travel line in the lane keeping control and a target inter-vehicle distance in the inter-vehicle distance control, in accordance with a driver's preference (refer to Japanese Patent Application Laid-Open No. 2020-26154).

However, the conventional apparatus is unable to adjust a driving feeling including a steering feeling and/or an acceleration feeling in the various driving assistance controls in accordance with a driver's preference.

SUMMARY

The present disclosure is made to cope with the above-described problem. Namely, one of objects of the present disclosure is to provide a driving assistance control apparatus for a vehicle, a driving assistance control method for a vehicle, and a non-transitory storage medium storing a program thereof, that are able to match the driving feeling with the driver's preference in the driving assistance controls as much as possible.

One of embodiments of the driving assistance control apparatus for a vehicle according to present disclosure comprises a controller configured to perform, as a driving assistance control, at least one of a steering assistance control (LTA) to automatically vary a steering angle of a host vehicle (HV) and an acceleration assistance control (ACC) to automatically vary an acceleration of the host vehicle, based on at least a traveling state of the host vehicle. The controller is further configured to: receive a setting operation input from a driver of the host vehicle (70, 71); and vary a strength degree of a steering assistance in the steering assistance control when the controller is configured to perform the steering assistance control based on (in accordance with) the setting operation input, or vary a strength degree of an acceleration assistance in the acceleration assistance control when the controller is configured to perform the acceleration assistance control based on (in accordance with) the setting operation input (FIG. 3, S420, S440, S550, S560, S620, S660, S670).

According to the above embodiment, the driving assistance control apparatus can vary the driving feeling in the driving assistance control, in accordance with the driver's preference.

Notably, in the above description, in order to facilitate understanding of the present disclosure, the constituent elements corresponding to those of an embodiment which will be described later are accompanied by parenthesized symbols and/or names which are used in the embodiment; however, the constituent elements of the disclosure are not limited to those in the embodiment defined by the symbols and/or names. The present disclosure covers a driving assistance control method, and a non-transitory storage medium storing a program thereof.

DETAILED DESCRIPTION

Figure 1:
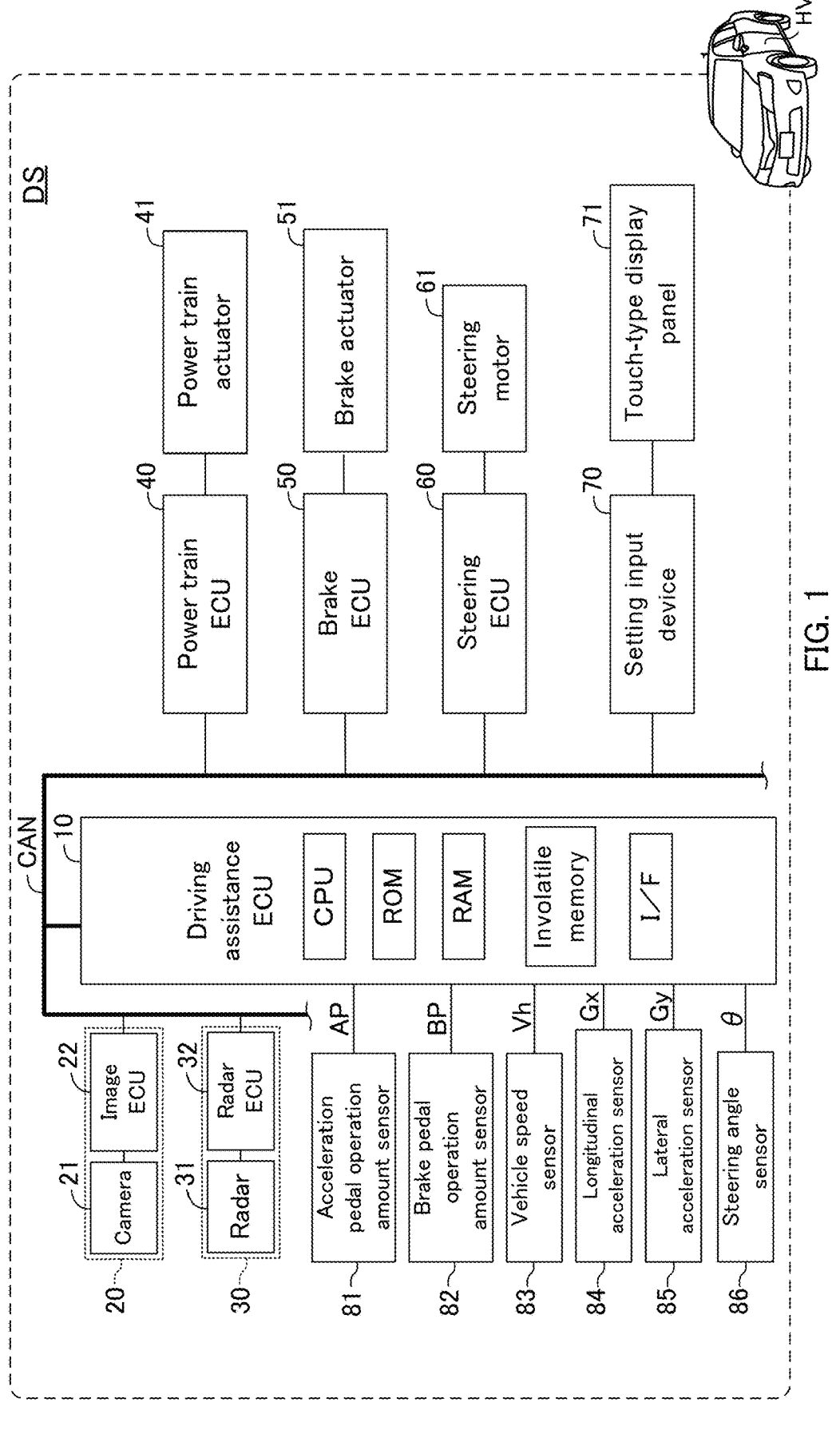
FIG. 1 is a schematic diagram of a driving assistance control apparatus for a vehicle according to an embodiment of the present disclosure.

A driving assistance control apparatus for a vehicle DS (hereinafter, referred to as an "apparatus DS") according to an embodiment of the present disclosure comprises components/elements illustrated in FIG. 1. The apparatus DS is applied to and/or is mounted on a host vehicle HV. The host vehicle HV may be one of a vehicle having an internal combustion engine as a drive source, a vehicle having an electric motor as a drive source (namely, an electric vehicle), and a hybrid vehicle.

In the present specification, an "ECU" means an electronic control device/unit (i.e., a control unit), that includes a microcomputer. The microcomputer includes a CPU (processor), a ROM, a RAM, a data writable involatile memory, and an interface. The ECU may sometimes be referred to as a "controller" or a "computer". A plurality of ECUs shown in FIG. 1 are connected to each other through Controller Area Network (CAN) in such a manner that they can exchange information with each other. Some or all of these ECUs may be integrated into a single ECU.

A driving assistance/support ECU 10 performs/executes a lane keeping control (i.e., a lane tracing assist: LTA), an inter-vehicle distance control (i.e., an adaptive cruise control: ACC), or the like, as driving assistance control. Functions of the driving assistance ECU 10 may be realized/implemented by a plurality of ECUs. The driving assistance ECU 10 is connected with elements (cameras, sensors, switches, and devices) illustrated in FIG. 1 (described below), and exchange information or signals with each other.

A camera device 20 includes a camera 21 and an image ECU 22. The camera 21 captures (or takes a picture of) a "scene in front of the host vehicle HV" so as to obtain image data, every time a predetermined time elapses. The image ECU 22 recognizes/detects, based on the image data sent from the camera 21, "a left demarcation line LL and a right demarcation line RL" of a host lane which is a lane in which the host vehicle HV is traveling. Note that a demarcation line of a lane is typically a lane demarcation line (a lane marker), such as a white line and a yellow line. The camera ECU 21 obtains, based on the image data sent from the camera 21, "a target travel line TL, a road curvature CL, a lateral difference DL, a yaw angle difference OL, or the like (refer to FIG. 2A)" described later. Furthermore, the image ECU 22 produces camera object information based on the image data sent from the camera 21. The camera object information includes "a position (a longitudinal position and a lateral position) and a kind" of an object present in front of the host vehicle HV.

A radar device 30 is a well-known device configured to obtain information on an object present in front of the host vehicle HV, using electrical waves in a millimeter wave-band. The radar device 30 includes a radar 31 and a radar ECU 32. The radar 31 transmits millimeter waves within a predetermined detection range and receives the millimeter waves reflected by the object, every time the predetermined time has elapses. The radar 31 transmits information on transmitted millimeter waves and information on received millimeter wave to the radar ECU 32. The radar ECU 32 obtains radar object information, based on the information sent from the radar 31. The radar ECU 32 transmits the radar object information to the driving assistance ECU 10. The radar object information includes a distance to the object, an azimuth of the object, and a relative speed of the object.

Note that the driving assistance ECU 10 fuses the camera object information and the radar object information to produce fusion object information.

A power train ECU 40 drives a power train actuator 41 in accordance with an instruction from the driving assistance ECU 10 or an operation of an unillustrated accelerator pedal by the driver, so as to vary a drive force generated by the drive device of the host vehicle HV for controlling an acceleration of the host vehicle HV.

A brake ECU 50 drives a brake actuator 51 in accordance with an instruction from the driving assistance ECU 10 or an operation of an unillustrated brake pedal by the driver, so as to vary a brake force generated by the brake device of the host vehicle HV for controlling a deceleration of the host vehicle HV.

A steering EUC 60 drives a steering motor 61 in accordance with an instruction from the driving assistance ECU 10 or an operation of an unillustrated steering wheel, so as to control a steering device of the host vehicle HV for varying a steering assist force and a steering angle (or a steered angle) of the host vehicle HV.

A setting input device 70 is connected to a "display panel 71 with touch-type button functions". The display panel 71 is located at a position such that the driver can operate the display panel 71. As described later, the driver can vary "an LTA control level and an ACC acceleration level" in accordance with his/her preference, by touch-operating the display panel 71 (refer to FIG. 2B to FIG. 2F).

The driving assistance ECU 10 receives detected values (output values) of sensors and switches described below.

An acceleration pedal operation amount sensor 81 that detects an acceleration pedal operation amount AP of the host vehicle HV.

A brake pedal operation amount sensor 82 that detects a brake pedal operation amount BP of the host vehicle HV.

A vehicle speed sensor 83 that detects a speed of the host vehicle HV (i.e., host vehicle speed Vh).

A front-rear acceleration sensor 84 that detects an acceleration (i.e., front-rear acceleration) Gx of the host vehicle HV in a front-rear direction.

A lateral acceleration sensor 85 that detects an acceleration (i.e., lateral acceleration) Gy of the host vehicle HV in a vehicle width direction.

A steering angle sensor 86 that detects a steering angle θ of a steering wheel of the host vehicle HV.

Note that the driving assistance ECU 10 is further connected with other sensors including a yaw rate sensor, and a steering torque sensor.

(Outline of Operation)

The apparatus DS performs, based on a traveling state of the host vehicle HV, the lane keeping control to automatically vary the steering angle of the host vehicle HV as one of the steering assistance controls, and the inter-vehicle distance control to vary the acceleration of the host vehicle HV as one of the acceleration assistance controls. The apparatus DS performs them as the driving assistance controls.

The apparatus DS can vary "a strength of the steering feeling (i.e., a steering assistance force) that is a strength degree of the steering assistance" in the lane keeping control in accordance with the driver's preference. The apparatus DS can also vary "an acceleration of the host vehicle HV that is a strength degree of the acceleration assistance" in the inter-vehicle distance control in accordance with the driver's preference.

Specifically, the apparatus DS can vary the "strength of the steering feeling" while the host vehicle HV is returned to the target travel line in the lane keeping control, when the driver of the host vehicle HV selects one of buttons 111 to 114 included in a "screen 110 (refer to FIG. 2C) for selecting a control level of the lane keeping control (LTA)" that is displayed on the display panel 71.

Figure 2A:
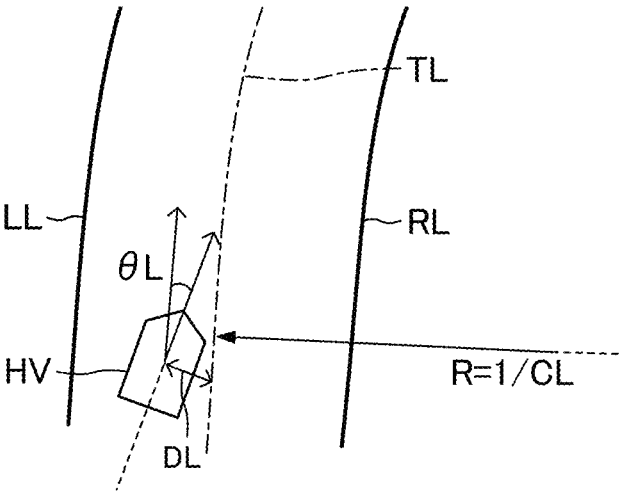
FIG. 2A is a drawing for describing parameters used for a lane keeping control.
Figure 2B:
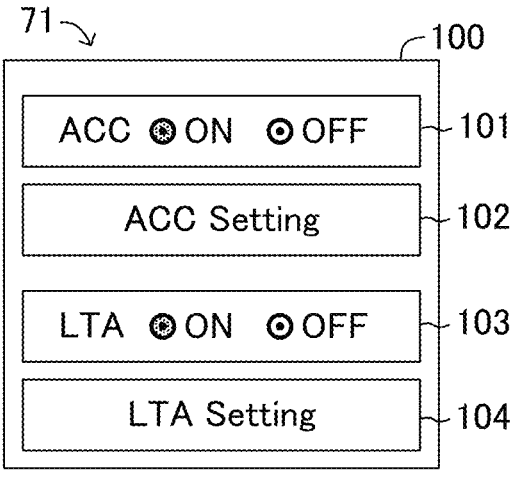
FIG. 2B is a drawing for illustrating an image displayed on the display panel shown in FIG. 1.
Figure 2C:
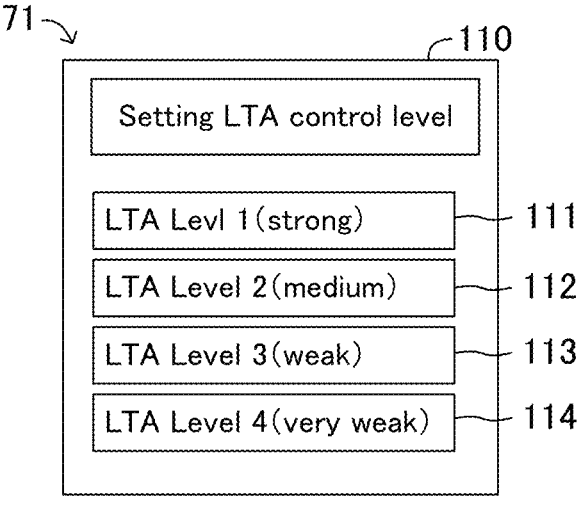
FIG. 2C is another drawing for illustrating an image displayed on the display panel shown in FIG. 1.
Figure 2D:
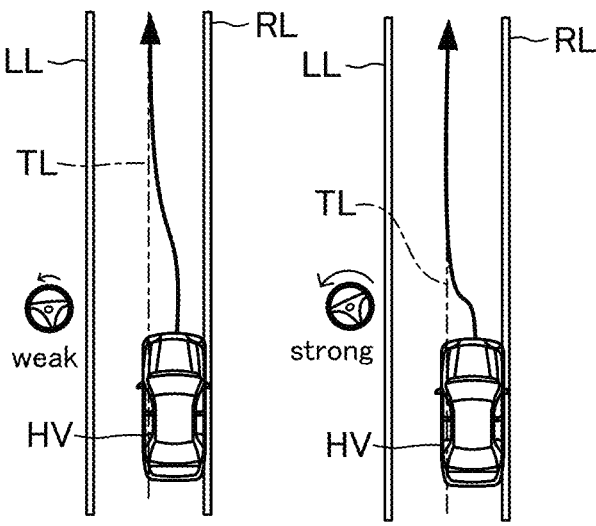
FIG. 2D is a drawing for illustrating examples of steering control in the lane keeping control.

For example, when the driver selects the button 114 corresponding to an "LTA level 4", the apparatus DS returns the host vehicle HV to the target travel line TL relatively mildly by varying the steering angle of the host vehicle HV gently, as shown in a left side figure in FIG. 2D. Whereas, when the driver selects the button 111 corresponding to an "LTA level 1", the apparatus DS returns the host vehicle HV to the target travel line TL relatively quickly by varying the steering angle of the host vehicle HV greatly, as shown in a right side figure in FIG. 2D.

In addition, the apparatus DS can vary the "acceleration of the host vehicle HV" in a period where the host vehicle HV is accelerated to a target speed when a preceding vehicle PV to be followed disappears in the inter-vehicle distance control, when the driver of the host vehicle HV selects one of buttons 121 to 124 included in a "screen 120 (refer to FIG. 2E) for selecting a control level of the inter-vehicle distance control (ACC)" that is displayed on the display panel 71.

Figure 2E:
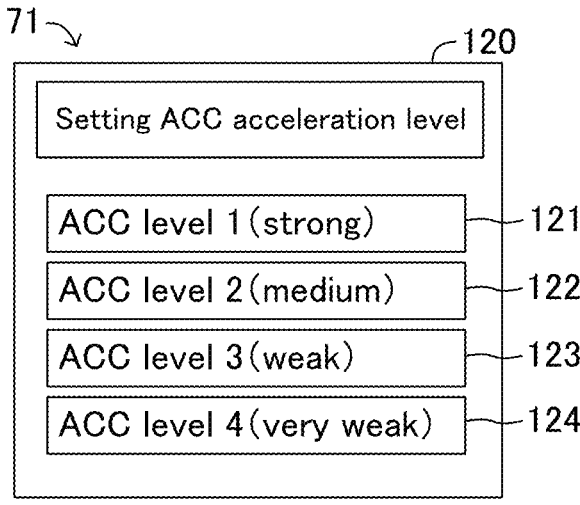
FIG. 2E is another drawing for illustrating an image displayed on the display panel shown in FIG. 1.
Figure 2F:
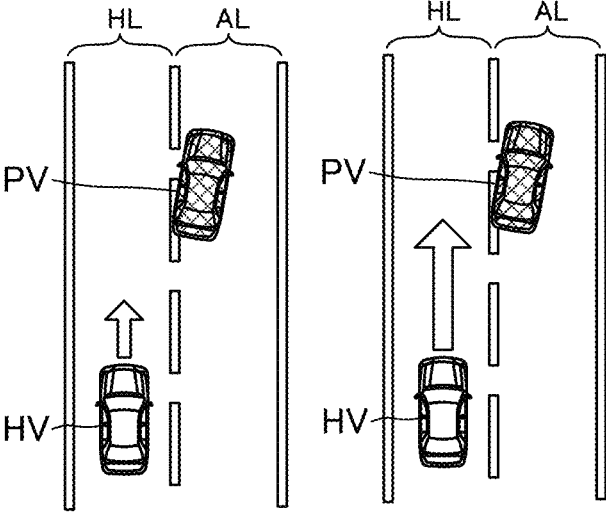
FIG. 2F is a drawing for illustrating examples of acceleration assistance control in the inter-vehicle distance control.

For example, when the driver selects the button 124 corresponding to an "ACC level 4", the apparatus DS accelerates the host vehicle at a small acceleration, as shown in a left side figure in FIG. 2F. Whereas, when the driver selects the button 121 corresponding to an "ACC level 1", the apparatus DS accelerates the host vehicle at a large acceleration, as shown in a right side figure in FIG. 2F.

(Specific Operation)

Figure 3:
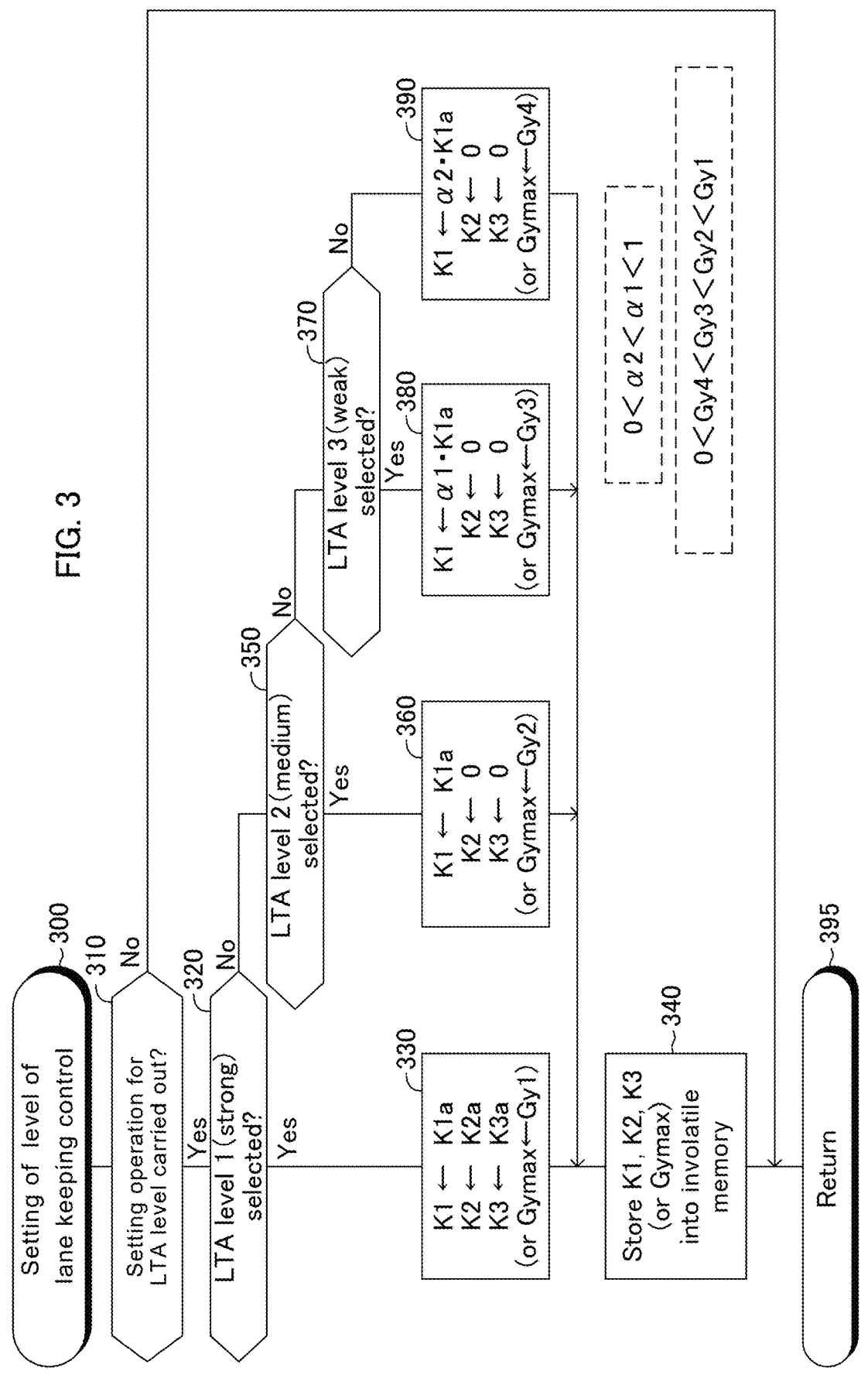
FIG. 3 shows a routine executed by a CPU of the driving assistance ECU shown in FIG. 1.
Figure 4:
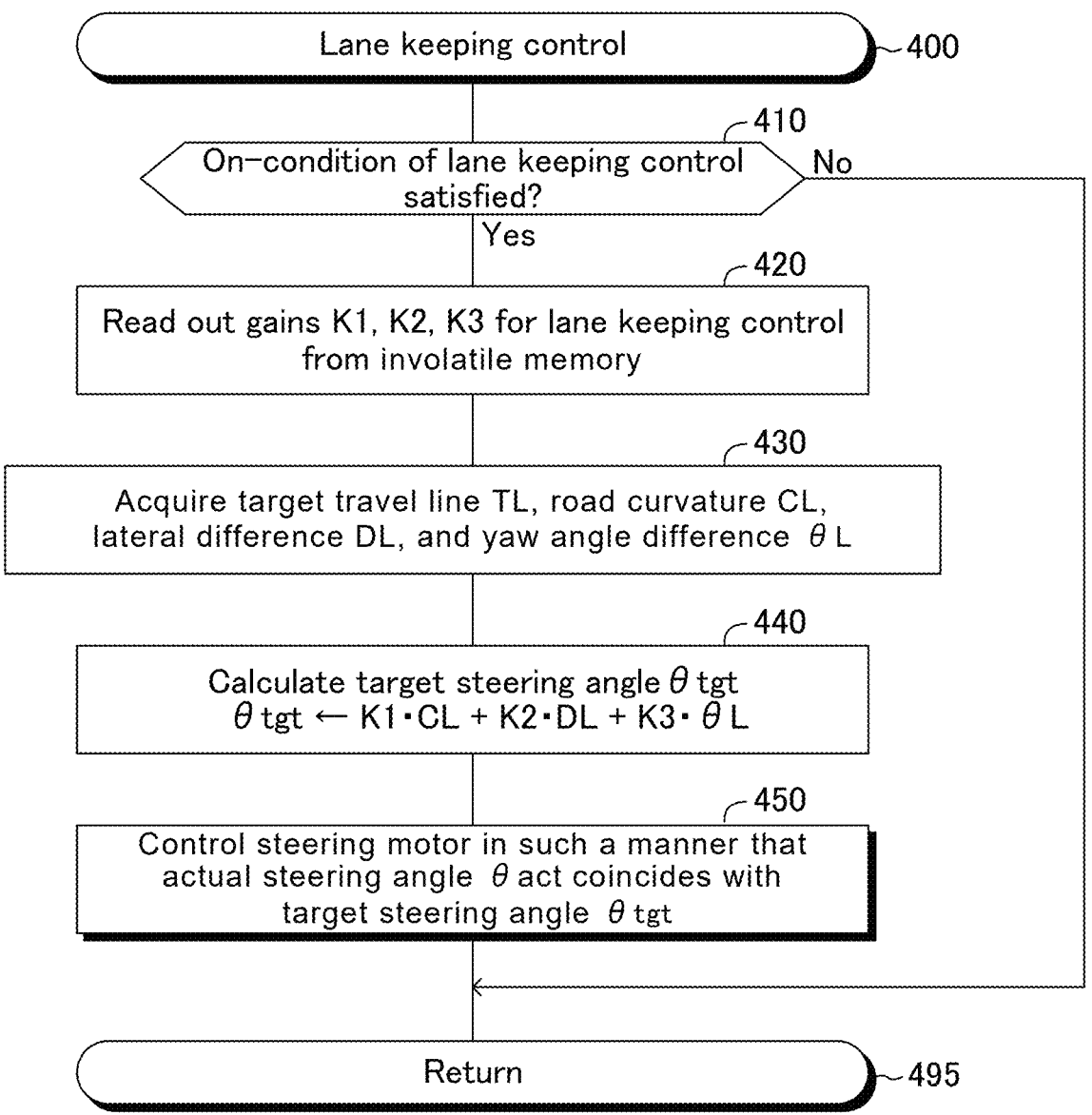
FIG. 4 shows a routine executed by the CPU of the driving assistance ECU shown in FIG. 1.
Figure 5:
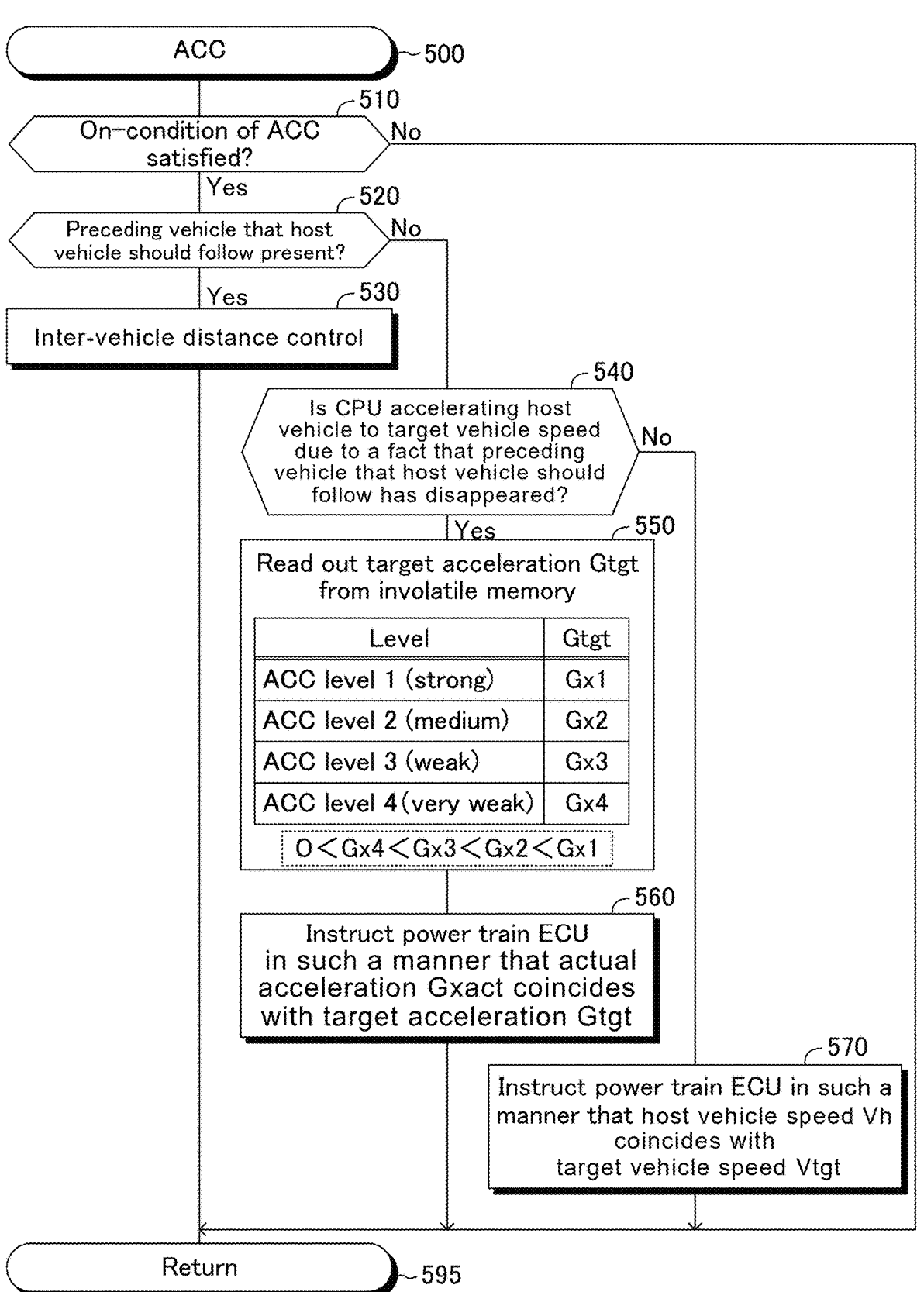
FIG. 5 shows a routine executed by the CPU of the driving assistance ECU shown in FIG. 1.

The CPU of the driving assistance ECU 10 executes routines shown by flowcharts in FIGS. 3 to 5, every time a predetermined time (calculation cycle) dt elapses. It should be noted that, hereinafter, "step" is expressed as "S".

<Varying (Setting) of the Level of the Lane Keeping Control>

When an appropriate time point comes, the CPU starts processing from S300 in FIG. 3, and proceeds to S310. At S310, the CPU determines whether or not a setting operation for the control level of the lane keeping control is carried out through the display panel 71. Specifically, when the driver of the host vehicle HV touches an "LTA setting button 104" included in a "menu screen 100 shown in FIG. 2B" that is displayed on the display panel 71, the setting input device 70 causes the display panel 71 to display an "LTA control level setting screen 110" shown in FIG. 2C.

The LTA control level setting screen 110 includes a button 111 for selecting an LTA level 1 (strong), a button 112 for selecting an LTA level 2 (middle), a button 113 for selecting an LTA level 3 (weak), and a button114 for selecting an LTA level 4 (very week). When the driver touches one of the buttons among the buttons 111-114, the setting input device 70 notifies the driving assistance ECU 10 that the setting operation of the control level of the lane keeping control is made. Note that the button 112 corresponding to the LTA level 2 is automatically selected in an initial state.

When the setting operation of the control level of the lane keeping control has been made, the CPU proceeds to S320 from S310 to determine whether or not the button 111 for selecting the LTA level 1 (strong) has been touched.

When the button 111 has been touched (i.e., when the LTA level 1 has been selected), the CPU proceeds to S330 from S320. At S330, the CPU sets a first gain K1 to a predetermined value K1a, sets a second gain K2 to a predetermined value K2a, and sets a third gain K3 to a predetermined value K3a. The first to third gains (K1, K2, K3) will be described later.

Subsequently, the CPU proceeds to S340 to store the values of the first to third gains (K1, K2, K3) into the involatile memory of the driving assistance ECU 10. Thereafter, the CPU proceeds to S395 to terminate the present routine tentatively.

If the button 111 has not been touched when the CPU proceeds to S320, the CPU proceeds to S350 from S320. At S350, the CPU determine whether or not the button 112 for selecting the LTA level 2 (medium) has been touched. When the button 112 has been touched (i.e., when the LTA level 2 has been selected), the CPU proceeds to S360 from S350. At S360, the CPU sets the first gain K1 to the above-described value K1a, sets the second gain K2 to "0", and sets the third gain K3 to "0". Thereafter, the CPU proceeds to S340, and then to S395.

If the button 112 has not been touched when the CPU proceeds to S350, the CPU proceeds to S370 from S350. At S370, the CPU determine whether or not the button 113 for selecting the LTA level 3 (weak) has been touched. When the button 113 has been touched (i.e., when the LTA level 3 has been selected), the CPU proceeds to S380 from S370. At S380, the CPU sets the first gain K1 to a product ($\alpha$1·K1a) of a coefficient $\alpha$1 and the above-described value K1a, sets the second gain K2 to "0", and sets the third gain K3 to "0". The coefficient $\alpha$1 is a constant value that is greater than "0" and smaller than "1". Thereafter, the CPU proceeds to S340, and then to S395.

If the button 113 has not been touched when the CPU proceeds to S370, the button 114 has been touched (i.e., the LTA level 4 has been selected). Therefore, the CPU proceeds to S390 from S370 to set the first gain K1 to a product ($\alpha$2·K1a) of a coefficient $\alpha$2 and the above-described value K1a, sets the second gain K2 to "0", and sets the third gain K3 to "0". The coefficient $\alpha$2 is a constant value that is greater than "0" and smaller than "1", and is smaller than coefficient $\alpha$1. Thereafter, the CPU proceeds to S340, and then to S395.

Note that, if the setting operation for the control level of the lane keeping control has not been carried out when the CPU proceeds to S310, the CPU directly proceeds to S395 from S310 to terminate the present routine tentatively.

<Lane Keeping Control (Lane Tracing Control)>

When an appropriate time point comes, the CPU starts processing from S400 in FIG. 4, and proceeds to S410 to determine whether or not an on-condition of the lane keeping control is satisfied. For example, the on-condition of the lane keeping control is satisfied, when all of a condition 1 to condition 3, described below, are satisfied. Note that the on-condition of the lane keeping control is not limited to this example.

(Condition 1) An on-condition of the inter-vehicle distance control has been satisfied.

(Condition 2) An "ON" of an "LTA ON/OFF button 103" included in the menu screen 100 shown in FIG. 2B has been selected.

(Condition 3) Both of "the left demarcation line LL and the right demarcation line RL" of the host lane, as shown in FIG. 2A, have been detected (recognized) by the camera device 20.

When the on-condition of the lane keeping control is not satisfied, the CPU directly proceeds to S495 from S410 to terminate the present routine tentatively. Whereas, when the on-condition of the lane keeping control is satisfied, the CPU executes processes of S420 to S450, and then, proceeds to S495.

S420; The CPU reads out the values of the first to third gains (K1, K2, K3) from the involatile memory.

S430; The CPU acquires the target travel line TL of the lane keeping control, the road curvature CL, the lateral difference DL, and the yaw angle difference OL, from the image data.

As shown in FIG. 2A, the target travel line TL is the line connecting center positions between the left demarcation line LL and the right demarcation line RL in the lane width direction. The road curvature CL is a curvature of the target travel line TL (i.e., an inverse of radius R of target travel line TL). The lateral difference (deviation) DL is a distance between a center of the body of the host vehicle HV in a body width direction (e.g., a center between a left front wheel and a right front wheel) and the target travel line TL. The yaw angle difference (deviation) OL is an angle between a tangent direction of the target travel line TL and a travel direction of the host vehicle HV.

S440: The CPU assigns "the values of the first to third gains (K1, K2, K3)" read out at S420, and "the road curvature CL, the lateral difference DL, and the yaw angle difference OL" acquired at S430 to a formula (1) below so as to calculate a "target steering angle $\theta$tgt" serving as a steering control amount.

$$\theta tgt = K1 \cdot CL + K2 \cdot DL + K3 \cdot \theta L \qquad (1)$$

The first term (K1·CL) in the above formula (1) is a feed-forward term that makes the host vehicle HV automatically travel along the curve of the host lane (i.e., target travel line TL). The "second term (K2·DL) and third term (K3.

θL)" in the above formula (1) are feedback terms for making the lateral difference DL and yaw angle difference θL equal to "0", respectively.

S450: The CPU controls the steering motor 61 by sending an instruction to the steering ECU 60 in such a manner that an actual steering angle θact (that is the steering angle θ detected by the steering angle sensor 86) coincides with the target steering angle θtgt. For example, the CPU obtains a target steering torque Tqtgt that should be generated by the steering motor 61, based on the target steering angle θtgt and the host vehicle speed Vh, using a look-up table or the like. The CPU transmits the target steering torque Tqtgt to the steering ECU 60. The steering ECU 60 causes the steering motor 61 to generate a torque equal to the target steering torque Tqtgt.

Note that the CPU may obtain the target steering torque Tqtgt in place of the target steering angle θtgt as the steering control amount, according to a formula having a right-hand member similar to one of the formula (1). In this case, the CPU transmits the target steering torque Tqtgt to the steering ECU 60.

Furthermore, the CPU may obtain the target yaw rate Yrtgt in place of the target steering angle θtgt as the steering control amount, according to a formula having a right-hand member similar to one of the formula (1). In this case, the CPU obtains a target steering torque Tqtgt for generating the target yaw rate Yrtgt, based on the target yaw rate Yrtgt and the host vehicle speed Vh, using a look-up table or the like. The CPU transmits the target steering torque Tqtgt to the steering ECU 60.

In this manner, when the LTA level 1 (strong) is selected, the first to third gains (K1, K2, K3) are set to the values (K1a, K2a, K3a). Therefore, a large steering torque is applied in such a manner that the host vehicle HV does not deviate from the target travel line TL, even slightly. Consequently, the strength degree of the steering assistance becomes very strong. When the LTA level 2 (medium) is selected, the first to third gains (K1, K2, K3) are set to the values (K1a, 0, 0). Therefore, since the feedback terms for the target travel line TL does not act, although the host vehicle HV travels along the target travel line TL due to the feedforward term, the driver needs to steer the host vehicle HV so as not to deviate from the target travel line TL. Namely, the strength degree of the steering assistance becomes medium. When the LTA level 3 (weak) is selected, the first to third gains (K1, K2, K3) are set to the values (α1·K1a, 0, 0). Therefore, the "assistance torque generated by the steering motor 61" for making the host vehicle HV travel along the shape of the road is weaker as compared to the LAT level 2. Therefore, the driver needs to steer to some extent to let the host vehicle HV travel along the target travel line TL. Namely, the strength degree of the steering assistance becomes weak. When the LTA level 4 (very weak) is selected, the first to third gains (K1, K2, K3) are set to the values (α2·K1a, 0, 0). Therefore, the "assistance torque generated by the steering motor 61" for making the host vehicle HV travel along the shape of the road is weaker as compared to the LAT level 3. Therefore, the driver needs to perform a considerable amount of steering to let the host vehicle HV travel along the target travel line TL. Namely, the strength degree of the steering assistance becomes very weak.

<Inter-Vehicle Distance Control>

When an appropriate time point comes, the CPU starts processing from S500 in FIG. 5, and proceeds to S510. At S510, the CPU determines whether or not an on-condition of the inter-vehicle distance control (ACC) is satisfied. For example, the on-condition of the inter-vehicle distance control is satisfied, when both of a condition 4 and a condition 5, described below, are satisfied. Note that the on-condition of the inter-vehicle distance control is not limited to this example.

(Condition 4) The host vehicle speed Vh is equal to or higher than a vehicle speed threshold Vth.

(Condition 5) An "ON" of an "ACC ON/OFF button 101" included in the menu screen 100 shown in FIG. 2B has been selected.

When the on-condition of the inter-vehicle distance control is not satisfied, the CPU directly proceeds to S595 from S510 to terminate the present routine tentatively. Whereas, when the on-condition of the inter-vehicle distance control is satisfied, the CPU proceeds to S520 from S510 to determine whether or not a preceding vehicle that the host vehicle HV should follow is present. Specifically, the CPU determines/regards, based on the fusion object information, that an other vehicle that is present in the host lane within a predetermined distance from the host vehicle and that is traveling in front of the host vehicle HV, as the preceding vehicle that the host vehicle HV should follow.

When the preceding vehicle that the host vehicle HV should follow is present, the CPU proceeds to S530 from S520 to perform the well-known inter-vehicle distance control. Specifically, the CPU controls the acceleration of the host vehicle HV through the power train ECU 40 and the brake ECU 50, in such a manner that the inter-vehicle distance between the host vehicle and the preceding vehicle that the host vehicle HV should follow coincides with a target inter-vehicle distance (refer to Japanese Patent Application Laid-Open No. 2020-26154, Japanese Patent Application Laid-Open No. 2014-148293, Japanese Patent No. 4172434, and Japanese Patent No. 4929777). Thereafter, the CPU proceeds to S595 to terminate the present routine tentatively.

Whereas, if the preceding vehicle that the host vehicle HV should follow is not present when the CPU proceeds to S520, the CPU proceeds to S540 from S520. At S540, the CPU determines whether or not the CPU is currently accelerating the host vehicle HV to a predetermined target vehicle speed due to a fact that the preceding vehicle that the host vehicle HV should follow has disappeared.

When the CPU is currently accelerating the host vehicle HV to a predetermined target vehicle speed due to a fact that the preceding vehicle that the host vehicle HV should follow has disappeared, the CPU proceeds to S550 from S540. At S550, the CPU reads out a target acceleration Gtgt from the involatile memory.

Specifically, when the driver of the host vehicle HV touches an "ACC setting button 102" included in the "menu screen 100 shown in FIG. 2B" that is displayed on the display panel 71 at a time point at which the host vehicle HV is activated, the setting input device 70 causes the display panel 71 to display an "inter-vehicle distance control (ACC) level setting screen 120" shown in FIG. 2E. Thereafter, the driver touches one of buttons among "the button 121 to button 124" included in the screen 120. This causes the CPU to execute an unillustrated routine, so as to store the target acceleration Gtgt corresponding to "one of the buttons 121 to the button 124" touched by the driver, into the involatile memory. Note that the button 122 corresponding to an ACC level 2 (medium) is automatically selected in an initial state.

For example, when the driver touches a button 121 to select an "ACC level 1 (strong)", an acceleration Gx1 is stored into the involatile memory as the target acceleration Gtgt.

When the driver touches a button 122 to select an "ACC level 2 (medium)", an acceleration Gx2 is stored into the involatile memory as the target acceleration Gtgt.

When the driver touches a button 123 to select an "ACC level 3 (weak)", an acceleration Gx3 is stored into the involatile memory as the target acceleration Gtgt.

When the driver touches a button 124 to select an "ACC level 4 (very weak)", an acceleration Gx4 is stored into the involatile memory as the target acceleration Gtgt.

Note that the following formula (2) is satisfied by these accelerations.

$$0 < Gx4 < Gx3 < Gx2 < Gx1 \qquad (2)$$

After the CPU reads out the target acceleration Gtgt from the involatile memory at S550, the CPU proceeds to S560 to control the acceleration of the host vehicle HV up to when the host vehicle speed Vh increases/reaches to the target vehicle speed, in such a manner that the actual acceleration of the host vehicle HV coincides with the target acceleration Gtgt through the power train ECU 40. Thereafter, the CPU proceeds to S595.

As a result, the host vehicle speed Vh is gradually increased and reaches the target vehicle speed. If the host vehicle speed Vh is equal to or higher than the target vehicle speed when the CPU proceeds to S540, the CPU makes a "No" determination at S540 so as to proceeds to S570. At S570, the CPU performs a well-known constant speed cruise control to let the host vehicle speed Vh coincide with the target vehicle speed. Thereafter, the CPU proceeds to S595.

In this manner, the CPU can set/vary the acceleration (target acceleration Gtgt) of when the CPU accelerates the host vehicle HV up to the predetermined target vehicle speed that is set separately, due to the fact that the preceding vehicle that the host vehicle HV should follow has disappeared, in accordance with the driver's preference.

Modified Example

Figure 6:
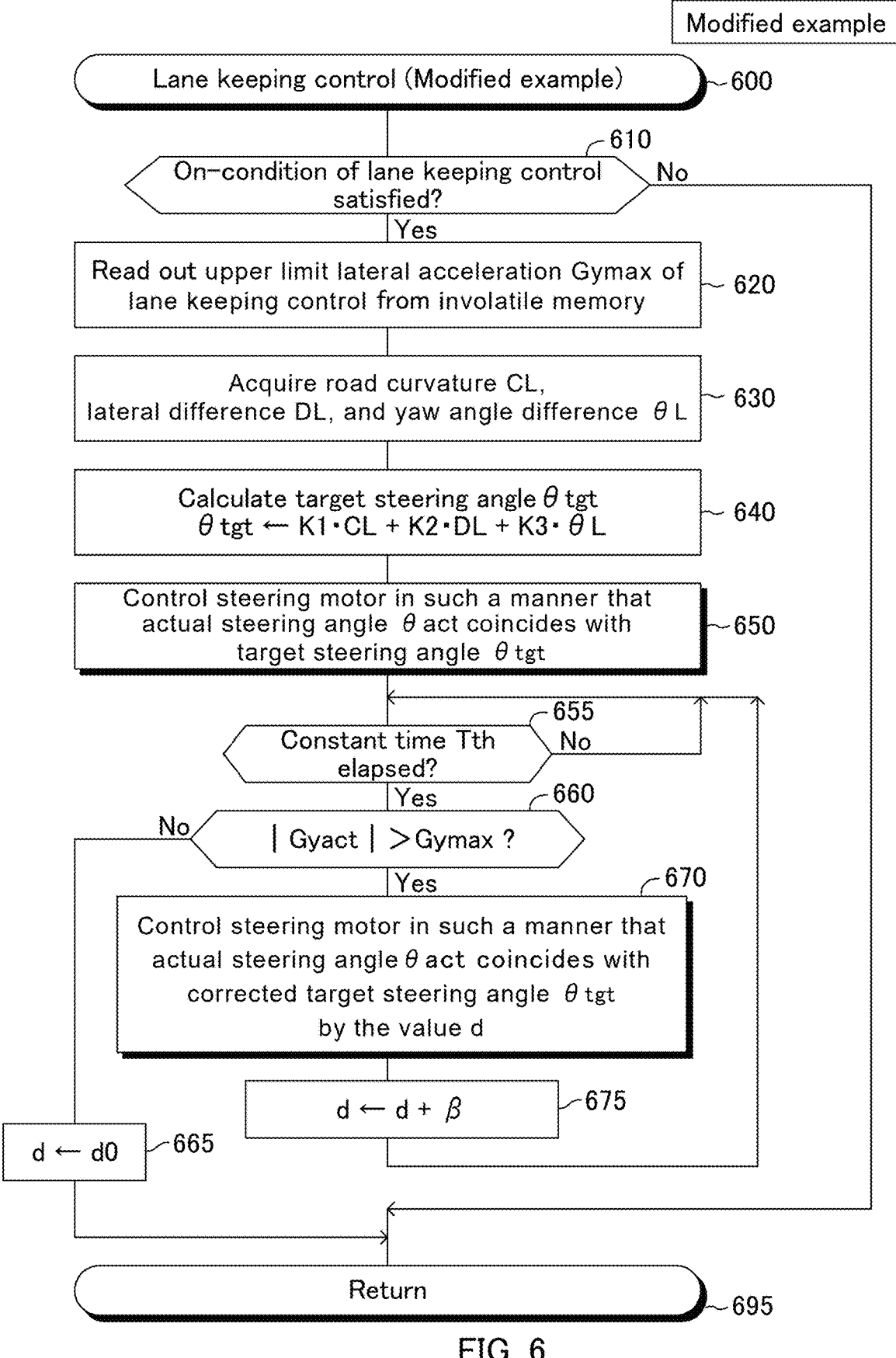
FIG. 6 shows a routine executed by a CPU of a driving assistance ECU according to a modified embodiment of the driving assistance ECU shown in FIG. 1.

The apparatus according to a modified example of the present disclosure is different from the above-described embodiment in that the CPU of the apparatus DS according to the modified example executes a routine shown in FIG. 6 in place of FIG. 4, every time the predetermined time dt elapses. Furthermore, the CPU of this apparatus DS according to the modified example sets the first to third gain (K1, K2, K3) to values (K1a, K2a, K3a), respectively, at S330, S360, S380, and S390.

In addition, the CPU of this modified example sets an upper limit lateral acceleration Gymax to a first lateral acceleration Gy1 at S330, sets the upper limit lateral acceleration Gymax to a second lateral acceleration Gy2 at S360, sets the upper limit lateral acceleration Gymax to a third lateral acceleration Gy3 at S380, and sets the upper limit lateral acceleration Gymax to a fourth lateral acceleration Gy4 at S390. Furthermore, the CPU stores the value of the upper limit lateral acceleration Gymax into the involatile memory. Note that the following formula (3) is satisfied by the first to fourth lateral accelerations.

$$0 < Gy1 < Gy2 < Gy3 < Gy4 \qquad (3)$$

When an appropriate time point comes, the CPU starts processing from S600 in FIG. 6, and proceeds to S610 to determine whether or not the on-condition of the lane keeping control is satisfied. The process of S610 is the same as that of S410 shown in FIG. 4. When the on-condition of the lane keeping control is not satisfied, the CPU directly proceeds to S695 from S610 to terminate the present routine tentatively. Whereas, when the on-condition of the lane keeping control is satisfied, the CPU makes a "Yes" determination at S610, and proceeds to S655 after performing processes of S620 to S650 described below.

S620: The CPU reads out the "upper limit lateral acceleration Gymax that is used for the lane keeping control" stored into the involatile memory at S340, from the involatile memory.

S630: The CPU acquires "the road curvature CL, the lateral difference DL, and the yaw angle difference OL" from the image data.

S640: The CPU assigns "the road curvature CL, the lateral difference DL, and the yaw angle difference OL" acquired at S630 to the above-described formula (1) so as to calculate the "target steering angle θtgt", similarly to S440. Note that the first gain K1 has been set at the value K1a, the second gain K2 has been set at the value K2a, and the third gain K3 has been set at the value K3a.

S650: The CPU controls the steering motor 61 by sending the instruction to the steering ECU 60 in such a manner the actual steering angle fact coincides with the target steering angle θtgt, similarly to S450.

At S655, the CPU determines whether or not a constant time T has elapsed since it executed the process of S650. When the constant time T has not elapsed, the CPU waits. When the constant time T has elapsed since it executed the process of S650, the CPU proceeds to S660 from S655 to determine whether or not a magnitude (|Gy|) of an actual lateral acceleration Gy (that is detected by the lateral acceleration sensor 85) is greater than the upper limit lateral acceleration Gymax read out from the involatile memory at S620.

When the magnitude (|Gy|) of the actual lateral acceleration Gy is equal to or smaller than the upper limit lateral acceleration Gymax, the CPU proceeds to S665 from S660 to set a correction value d to a constant value d0. Thereafter, the CPU proceeds to S695.

Whereas, when the magnitude (|Gyact|) of the actual lateral acceleration Gyact is greater than the upper limit lateral acceleration Gymax, the CPU proceeds to S670 from S660 to correct the target steering angle θtgt such that an absolute value |θtgt| of the target steering angle θtgt becomes a value which is smaller than |θtgt| by the value d, and controls the steering motor 61 in such a manner that the actual steering angle θact coincides with the corrected target steering angle θtgt.

Subsequently, the CPU proceeds to S675 to increase the correction value d by a value β. Thereafter, the CPU returns to S655 to wait till the constant time T elapses. When the constant time T elapses, the CPU proceeds to S660 from S655.

As a result, the target steering angle θtgt is varied in such a manner that the magnitude of the target steering angle θtgt is gradually decreased until the magnitude (|Gyact|) of the actual lateral acceleration Gyact becomes equal to or smaller than the upper limit lateral acceleration Gymax. In other words, the host vehicle HV is made come closer to the target travel line TL while the magnitude (|Gyact|) of the actual lateral acceleration Gyact does not exceed the upper limit lateral acceleration Gymax. As the upper limit lateral acceleration Gymax is greater, a variation tolerance range of the steering torque generated by the steering motor 61 becomes greater. Therefore, as the upper limit lateral acceleration Gymax is greater, the strength degree of the steering assistance becomes stronger.

As has been described, according to the above-described embodiment and the modified example, the driver can set/vary "the strength degree of the steering assistance and the strength degree of the acceleration assistance" in the driving assistance controls, in accordance with his/her preference. Therefore, the above-described embodiment and the modified example can vary the driving feeling in the driving assistance controls, in accordance with driver's preference.

It should be noted that the present disclosure is not limited to the above-described embodiment and the modified embodiment, and may adopt various modifications within the scope of the present disclosure. For example, the present disclosure can be applied to a host vehicle that is an autonomous driving vehicle in a state where its driving mode has been switched from automatic driving to manual driving. In addition, the present disclosure can be applied to a lane departure prevention control and/or a lane change assistance control, as the steering assistance control. Also, the present disclosure can be applied to an acceleration control during a resume mode (i.e., when the constant speed cruise control is resumed) after the cancel of the constant speed cruise control, as the acceleration assistance control. Furthermore, the above-described embodiment and the modified embodiment may be configured to set/vary only one of "the strength degree of the steering assistance and the strength degree of the acceleration assistance".

What is claimed is:

1. A driving assistance control apparatus for a vehicle comprising a controller configured to perform, as a driving assistance control, at least one of a steering assistance control to automatically vary a steering angle of a host vehicle and an acceleration assistance control to automatically vary an acceleration of said host vehicle, based on at least a traveling state of said host vehicle,
 wherein,
 said controller is configured to:
 receive a setting operation input from a driver of said host vehicle; and
 vary a strength degree of a steering assistance in said steering assistance control when said controller is configured to perform said steering assistance control, in accordance with said setting operation input, or vary a strength degree of an acceleration assistance in said acceleration assistance control when said controller is configured to perform said acceleration assistance control, in accordance with said setting operation input,
 wherein,
 said controller is configured to perform, as said steering assistance control, a lane keeping control to automatically vary a steering angle of said host vehicle in such a manner that said vehicle travels along a target travel line that is set in a lane in which said host vehicle is traveling,
 and wherein,
 said controller is further configured to:
 acquire a road curvature (CL) that is a curvature of said target travel line, a lateral difference (DL) that is a distance between said host vehicle and said target travel line in a lane width direction, and a yaw angle difference ($\theta$L) that is an angle between a tangent direction of said target travel line and a travel direction of said host vehicle; and obtain, through calculation, a steering control amount for varying said steering angle, based on,
 a first term (K1·CL) that is a product of said road curvature (CL) and a first gain (K1),
 a second term (K2·DL) that is a product of said lateral difference (DL) and a second gain (K2), and
 a third term (K3·$\theta$L) that is a product of said yaw angle difference ($\theta$L) and a third gain (K3); and
 vary said first gain, said second gain, and said third gain, in accordance with said setting operation input, so as to vary said strength degree of said steering assistance.

2. A driving assistance control apparatus for a vehicle comprising a controller configured to perform, as a driving assistance control, at least one of a steering assistance control to automatically vary a steering angle of a host vehicle and an acceleration assistance control to automatically vary an acceleration of said host vehicle, based on at least a traveling state of said host vehicle,
 wherein,
 said controller is configured to:
 receive a setting operation input from a driver of said host vehicle; and
 vary a strength degree of a steering assistance in said steering assistance control when said controller is configured to perform said steering assistance control, in accordance with said setting operation input, or vary a strength degree of an acceleration assistance in said acceleration assistance control when said controller is configured to perform said acceleration assistance control, in accordance with said setting operation input,
 wherein,
 said controller is configured to perform, as said steering assistance control, a lane keeping control to automatically vary a steering angle of said host vehicle in such a manner that said vehicle travels along a target travel line that is set in a lane in which said host vehicle is traveling,
 and wherein,
 said controller is further configured to:
 acquire a road curvature (CL) that is a curvature of said target travel line, a lateral difference (DL) that is a distance between said host vehicle and said target travel line in a lane width direction, and a yaw angle difference ($\theta$L) that is an angle between a tangent direction of said target travel line and a travel direction of said host vehicle; and
 obtain, through calculation, a steering control amount for varying said steering angle, based on said road curvature (CL), said lateral difference (DL), and said yaw angle difference ($\theta$L);
 vary an upper limit lateral acceleration (Gymax) in accordance with said setting operation input; and
 correct said steering control amount in such a manner that an actual lateral acceleration does not exceed said upper limit lateral acceleration, so as to vary said strength degree of said steering assistance.

3. A driving assistance control apparatus for a vehicle comprising a controller configured to perform, as a driving assistance control, at least one of a steering assistance control to automatically vary a steering angle of a host vehicle and an acceleration assistance control to automatically vary an acceleration of said host vehicle, based on at least a traveling state of said host vehicle,
 wherein
 said controller is configured to:
 receive a setting operation input from a driver of said host vehicle; and vary a strength degree of a steering assistance in said steering assistance control when said controller is configured to perform said steering assistance control, in accordance with said setting operation input, or vary a strength degree of an acceleration assistance in said acceleration assistance control when said controller is configured to perform said acceleration assistance control, in accordance with said setting operation input, wherein, said controller is configured to perform, as said acceleration assistance control, an inter-vehicle distance control to control an acceleration of said host vehicle so as to follow a preceding vehicle present in front of the host vehicle, and to accelerate said host vehicle at a predetermined target acceleration up to a predetermined target vehicle speed in a specific case where said preceding vehicle disappears after said preceding vehicle is present, and wherein, said controller is further configured to vary said target acceleration in accordance with said setting operation input in said specific case, so as to vary said strength degree of said acceleration assistance.

* * * * *